United States Patent [19]

O'Steen, Jr.

[11] Patent Number: 4,469,550

[45] Date of Patent: Sep. 4, 1984

[54] TOOL FOR SETTING UP AND APPLYING PRESSURE SENSITIVE GRAPHIC MATERIALS

[76] Inventor: Rema L. O'Steen, Jr., P.O. Box 328, Douglas, Ga. 31533

[21] Appl. No.: 427,939

[22] Filed: Sep. 29, 1982

[51] Int. Cl.³ .............................................. B32B 31/00

[52] U.S. Cl. .................................... 156/584; 156/235; 156/240; 156/247; 156/249; 156/344; 156/540

[58] Field of Search ............... 156/344, 584, 247, 249, 156/379, 235, 240, 540

[56] References Cited

U.S. PATENT DOCUMENTS

| | | | |
|---|---|---|---|
| 2,899,105 | 8/1959 | Testi | 206/16 |
| 3,040,802 | 6/1962 | Frazer | 156/344 |
| 3,265,198 | 8/1966 | Braginetz et al. | 206/16 |
| 3,502,203 | 3/1970 | Braginetz | 206/16 |
| 3,728,190 | 4/1973 | Clay | 156/235 |
| 4,245,555 | 1/1981 | Alston | 156/240 |

*Primary Examiner*—Caleb Weston
*Assistant Examiner*—Timothy W. Heitbrink
*Attorney, Agent, or Firm*—Harry I. Leon

[57] ABSTRACT

A hand held tool with a guide element and a resilient, transparent plate proximate thereto to aid in stripping the protective backing from the adhesive coated side of a pressure sensitive tape and in subsequently applying it to a suitable display surface. The guide element controls the separation of the backing from the tape and is positioned so that the side thereof lacking adhesive coating comes into contact with the plate even as the leading edge of the tape is being pulled away from its backing. Electrostatic attraction between the tape and the plate prevents the tape from sliding therefrom as the plate is first inverted and then moved about to preposition the tape. Tiny feet protruding from the plate hold the tape out of contact with the surface to which it is to be affixed until the user, viewing it through the transparent plate, presses the plate against the display surface.

5 Claims, 3 Drawing Figures

Fig. 1.
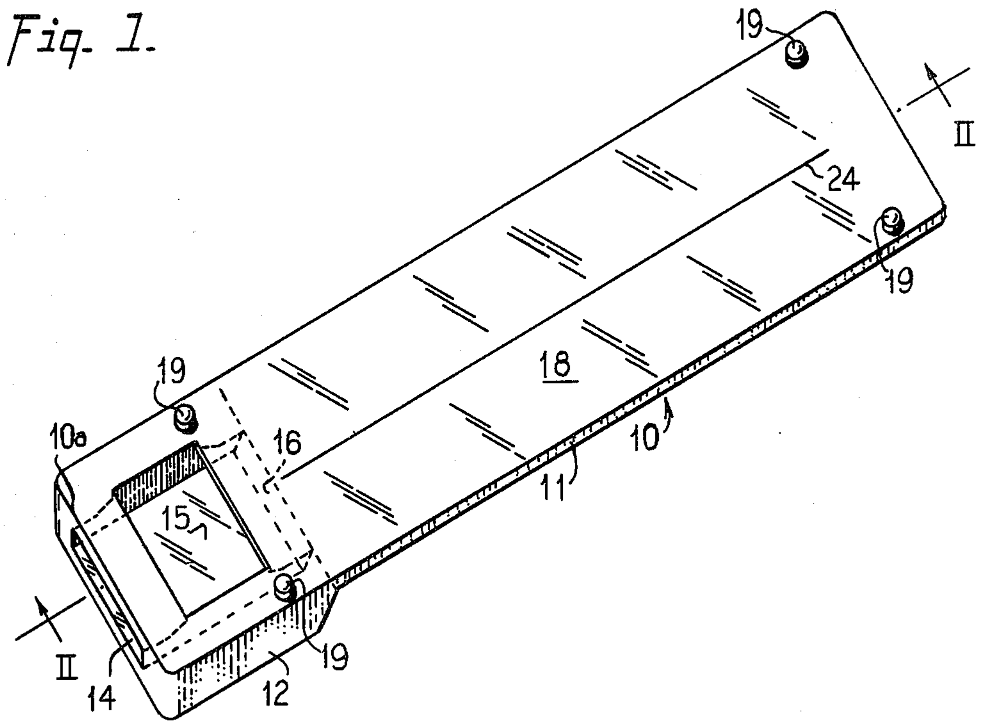
Fig. 2.
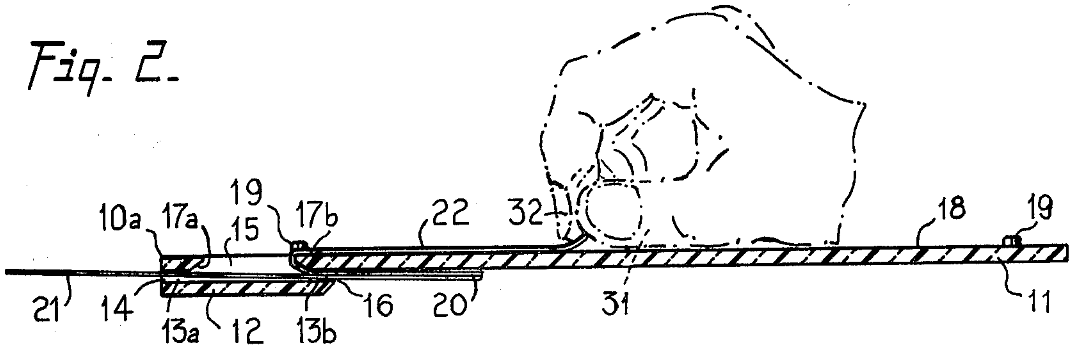
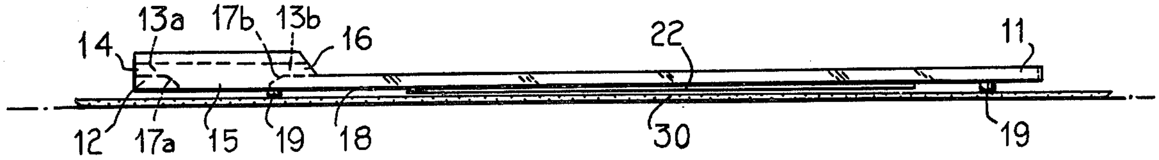
Fig. 3.

TOOL FOR SETTING UP AND APPLYING PRESSURE SENSITIVE GRAPHIC MATERIALS

BACKGROUND OF THE INVENTION

1. Field of the Invention

This invention relates generally to means and method for setting up and applying a plastic film sheet or strip, one side of which has a pressure sensitive adhesive coating, to a suitable display surface and more particularly to a tool for removing the protective backing from a section of said film containing informative material and prepositioning it prior to the film being affixed to an architectural or engineering drawing, a tracing, an artwork, a sign, a poster, or the like.

2. Description of the Prior Art

During the preparation of architectural and engineering drawings, it has become common practice to type or otherwise imprint information which is supplemental to the main subject matter of a drawing on separate sheets or strips of transparent plastic film suitably pre-coated with adhesive for attachment to the drawing. Typically, this supplemental material includes general specifications, equipment schedules and the like which are time-consuming and expensive to hand letter. The drawings themselves, commonly referred to as "master drawings" and measuring 22×34 inches more or less, are too large to be typed on directly in a conventional typewriter without creasing. While preparing master drawings with the use of such film has eliminated much of the expense and time formerly required for hand lettering, the methods and devices used or proposed for use for accomplishing the tasks of removing the backing protecting the adhesive coated surface of such a film prior to its use and then applying it to a master drawing have been far from satisfactory.

Up to the present, stripping the protective backing from sheets or tape has been initiated with the insertion of a long fingernail or of a knife edge beneath the backing near a corner thereof. Wielding a knife edge in such an operation can, of course, be both hazardous to a user and damaging to the film which one wishes to affix. Once separation is successfully started, the user must remove the backing from the film while simultaneously stretching it between the index finger and the thumb of both hands, a procedure requiring three hands. Otherwise, the electrostatic charge generated when the backing is separated will cause the film to cling to any convenient object and may bring an adhesive coated section of the film into premature contact with a nearby surface.

Once the backing is separated, the user has had only two options: either to affix the film directly to the master drawing itself or to a transfer device. In a direct application, considerable difficulty is experienced in lowering the film to the surface of the master drawing with any degree of precision in alignment and simultaneously extricating one's fingers. Moreover, an electrostatic charge on the film makes last second readjustments in alignment impractical as the film, its adhesive coated surface exposed to the master drawing, approaches it. Attaching a portion of the adhesive coated side of the film to the previously removed backing, recycled to serve as a transfer device, is an alternate method practised by some but is awkward and time-consuming to accomplish.

SUMMARY OF THE INVENTION

The object of this invention is to provide an improved method and apparatus for removing the backing protecting the adhesive coated side of a pressure sensitive film and then applying it to a suitable display surface.

A tool according to the present invention comprises a guide element and a resilient, transparent support member proximate thereto. An aperture formed in the guide element is adapted for receiving the film prior to the removal of its backing. A portion of the film, not fed into the aperture, is allowed to protrude a short distance beyond the frame surrounding the aperture. With a thumb pressing part of the film against the frame of the guide element, an index finger on the user's other hand may then be employed to flick the protruding portion, thereby causing the backing to begin to separate from the film. The section of backing so separated is then introduced into the aperture and through it into a passageway communicating therewith. Branches of the passageway, which extend laterally in opposite directions from the aperture and generally perpendicularly to its main axis, are provided to restrain the movements of both the backing by itself and the portion of the film to which backing is still attached so that, as the film is being pulled through the aperture, the backing is automatically advanced through the passageway.

The support member is positioned so that the film, as it exits the aperture of the guide element, can be pulled across the member with the adhesive coated side of the film, formerly protected by the backing, being directed outwardly from the surface of the member. The electrostatic charge which develops during the removal of the backing is utilized to hold the film in contact with the member. The attracting force is sufficient to prevent the film from sliding from the member as the member is first inverted and then moved across the display surface with the adhesive coated side of the film contiguous thereto. Feet slightly thicker than the film itself protrude from the member, thereby preventing premature contact between the film and the surface to which it is to be affixed. The support member itself is transparent so that a user, viewing the film through the member, can accurately align the film with respect to the display surface prior to transferring the film thereto by bending the member slightly.

Thus a tool is provided with which a person using only two hands can easily remove the backing from a pressure sensitive film, accurately preposition it with respect to a display surface, and attach it thereto. The film, stripped of its protective backing, clings to the tool itself rather than sticking prematurely to a nearby object. Moreover, only a minimum amount of contact between the user's hands and the film is required; and this contact can be terminated altogether prior to aligning the film with the display surface.

BRIEF DESCRIPTION OF THE DRAWINGS

Further details are explained below with the help of the examples illustrated in the attached drawings in which:

FIG. 1 is a perspective view of the tool according to the present invention;

FIG. 2 is a cross-section II—II from FIG. 1 on a reduced scale showing the position of the pressure sensitive film as it is being pulled away from its protective backing; and FIG. 3 is a side elevation on a reduced scale of the tool according to FIG. 1 showing the tool in position preparatory to the transfer of the film to the display surface.

DESCRIPTION OF THE PREFERRED EMBODIMENT

Referring to the drawings, there is shown therein a tool 10 according to the present invention. It comprises a guide element 12 and a support member such as a plate 11. The plate 11, which extends generally laterally from the element 12, is formed of a material having the properties of transparency and of resiliency. At the same time, the plate 11 has sufficient stiffness that a short span thereof will retain its shape under its own weight.

In the preferred embodiment illustrated in FIGS. 1–3, the plate 11 and the guide element 12 form a single, unitary piece cast from liquefied acrylic or the like. Alternately, the tool 10 may comprise a laminated plastic fabricated from sheets of acrylic or the like and held together by a suitable adhesive or by any appropriate mechanical fasteners such as metal or plastic machine screws. In such an alternate embodiment, an outermost layer formed from a single sheet of transparent acrylic extends a substantial distance beyond the proximate edges of the other layers to form the plate.

As is best seen in FIG. 2, the guide element 12 comprises a structure having a generally rectangular aperture 15 and a passageway communicating therewith. The branches 13*a*, 13*b* of the passageway extend laterally in opposite directions from the aperture 15 and are disposed generally perpendicularly to its main axis. The openings 14, 16 in which the branches 13*a*, 13*b*, respectively, terminate as well as the transverse cross-sections thereof are narrow and elongate. A wall 17*b* on one side of the aperture 15 and proximate the plate 11 is beveled, tapering away from the aperture 15 toward the rearward branch 13*b*. Similarly, a wall 17*a*, opposing the wall 17*b*, slopes toward the opening 14 in the forward branch 13*a*. The guide element 12 comprises means for guiding the film 22, once it has been separated from its backing 21 as described hereinbelow, onto the plate 11 with the side of the film 22 which is coated with adhesive being directed away from the surface 18.

Feet 19 protrude from the surface of the tool 10 on the side thereof which is proximate the aperture 15 (see FIGS. 1–3). At least one foot 19 is disposed near the distal end of the plate 11. A pair of feet 19 are situated proximate the corners of the aperture 15 which are closest to the plate 11. The feet 19 may be formed as a single, unitary piece with the remainder of the tool 10. Alternately, the feed 19 may be fabricated of plastic, metal, rubber, felt or the like and affixed to the surface of the tool 10 by any appropriate mechanical fasteners such as screws, rivets, or bolts or by an adhesive. The feet 19 comprise means for holding the adhesive coated side of the film out of contact with a display surface to which it is to be affixed when the film 22, clinging to the plate 11 after the backing 21 is removed, is interposed between the plate 11 and the display surface 30.

The tool 10 can be used with most graphic materials which have at least two laminated plies, one of which is formed from plastic film, paper, or the like and has a pressure sensitive adhesive coating on one side thereof which is protected by wax paper or by a similar backing and on which an electrostatic charge is developed as the backing is removed therefrom. The ply with the adhesive coating is also the one which may bear informative material such as imprinted or typed matter, lettering, or drawn designs.

As illustrated in FIG. 2, 20 designates as a whole a graphic material such as a plastic film, one side of which is coated with pressure sensitive adhesive protected by a backing 21; 22 designates plastic film from which the backing 21 has been removed. Such plastic film with its adhesive coating and protective backing is available in the form of tapes, sheets, preprinted title blocks, labels, decals and the like which are known commercially by trademarks, "Kroytype," "Stanpat," "Stickybak," and "Reprofilm."

To utilize the tool 10, a user may grasp it in one hand and thread the film 20, provided it is approximately $1\frac{1}{4}$ inches in length or longer, into the rearward branch 13*b*. An end portion of the film 20 is allowed to protrude from the aperture 15 so that this portion may be pressed between the user's thumb (not shown) and the tool 10. Preferably, the end portion is held so that it extends approximately 1/16th inch over the edge 10*a* of the tool 10 with the backing 21 contiguous thereto. Initial separation of the backing from the plastic film 20 can then be achieved by flicking upward on the protruding end portion with the index finger (not shown) of the opposite hand until the film 22 and backing 21 disunite.

The user then lightly grasps the exposed portion of the film 22 between his index finger and proximate thumb and pulls gently on it to cause further separation from the backing 21 until it can be dropped into the aperture 15 and caught beneath the sloping wall 17*a*. Once the leading edge of the backing 21 is so positioned, it can be pushed downward into the branch 13*a* of the passageway as illustrated in FIG. 2.

As the backing 21 begins to advance through the opening 14, the branches 13*a*, 13*b* of the passageway restrain the movement of the backing 21 on either side of the leading edge of its interface with the film 22 so that it can be pulled away from the backing 21 even as a portion thereof is ejected from the opening 14 (see FIG. 2). The user handles only one end of the film 22; a light grasp thereof between the tips of the thumb 31 and of the index finger 32 of one hand is sufficient to strip the film 22 from its backing 21. The beveled wall 17*b* protects the film 22 as its path diverges from that of the backing 21.

The plate 11 is positioned so that the film 22, after it exits the aperture 15, can be pulled across the plate 11 with the adhesive coated face of the film being directed outwardly from the surface 11*a*. A user, upon bringing the side of the film lacking adhesive coating into contact with the surface 18, is thus afforded means for controlling a tendency of the film 22, without its protective backing 21, to be attracted to any proximate object. An electrostatic charge generated on the film 22 when its backing 21 is being removed causes it to cling to the plate 11.

The strength of the electrostatic attraction between the film 22 and the plate 11 is such that a user gently pulling on one end of the film 22 can readily move it along the surface 18; but at the same time, the electrostatic forces will prevent the film 22 from sliding across the plate 11 as it is moved about or inverted, there being more than ample time for prepositioning the film 22 with respect to the display surface 30, as described hereinbelow, before the electrostatic charge has dissipated.

The plate 11 may also be utilized to apply a film 20 which is shorter than approximately 1¼ inches in length. In such a case, the user merely peels off the backing 21 and positions the film 22 on the surface 18 with the adhesive coated side of the film 22 directed outwardly therefrom. Again an electrostatic charge developed on the film 22 when its backing 21 is being removed causes the film 22 to cling to the plate 11.

With the film 22 lying upon the plate 11, a user can easily extricate the tips of his thumb 31 and index finger 32 with the aid of a fingernail, a wooden toothpick (not shown) or the like. Further, the film 22 may be positioned, using such an instrument, relative to a centerline 24 which may be inscribed or etched on the surface 18 (see FIG. 1). At this stage, a person directly viewing the film 22 upon the surface 18 observes, in the case of a film 22 having a transparent field, the mirror image of any informative material appearing on the film 22. The customary arrangement of this informative material is presented when the tool 10 is inverted so that the film 22 can be viewed through the transparent plate 11.

As illustrated in FIG. 3, the feet 19, which are slightly thicker than the film 22, prevent premature contact between it and the display surface 30 to which it is to be affixed. The surface 30 may be that of a master drawing, an artwork, a tracing, a window glass, or the like. The film 22, with its adhesive coated side exposed to the surface 30 but separated therefrom by a slight distance, will cling to the plate 11 while the user moves the tool 10 across the surface 30.

Lettering on the film 22 is most easily positioned when guidelines (not shown) are provided on the surface 30. The centerline 24 on the plate 11 may be utilized with a straight edge (not shown) to facilitate alignment of supplemental informative material on the film 22 with related material already positioned on the surface 30.

When the user, viewing the film 22 through the transparent plate 11, determines that the film 22 is over its desired position, he can press lightly, applying only fingertip pressure, to bend the plate 11 slightly and bring the film 22 into contact with the surface 30. The adhesive strength of the bond between the film 22 and the surface 30 overcomes the electrostatic attraction between the film 22 and the plate 11, and the film 22 separates therefrom. The step of adhering the film 22 to the surface 30 may be completed by burnishing the plate 11 with a finger tip. Thus accurate alignment of the film 22 and of informative material thereon with respect to the surface 30 can be obtained.

It will be understood that the invention is not limited to the embodiments disclosed, but is capable of numerous rearrangements, modifications, and substitutions without departing from the scope of the invention.

What is claimed is:

1. A tool to aid in applying a film, one side of the film being coated with a pressure sensitive adhesive and protected, initially, by a removable backing, in overlying adhering relationship to a display surface, comprising:

(a) a guide element having an aperture and a through passageway with forward and rearward branches which extend generally laterally in opposite directions from the aperture and which communicate therewith, the aperture being adapted to receive a section of the film which has been stripped of its backing and the forward branch being adapted to receive a section of the backing which has been separated from the film;

(b) a support member which extends generally laterally from an outer edge of the aperture and which overhangs an entrance to the rearward branch, the entrance being distal from said outer edge of the aperture, the support member having a transparent region projecting beyond at least one wall of the rearward branch a distance substantially greater than the length of the through passageway, so that a leading portion of the side of said film lacking adhesive coating can be guided onto said transparent region with the side of said portion which is coated with the adhesive being directed away from said region; and (c) means connected to the support member for holding the adhesive coated side of said portion out of contact with the display surface when the film, clinging to said region because of an electrostatic charge spontaneously generated on the film when its backing is removed, is interposed between said region and the display surface, so that premature contact therewith is prevented and the film can be prepositioned with respect to the display surface.

2. A tool according to claim 1 which further comprises means for controlling the separation of the film from its backing in which a trailing section of the film is pulled away from its backing at the same time said portion of the film is being pulled across and in contact with the support member.

3. A tool according to claim 1 wherein the transparent region of the support member is further characterized as having an open, unbroken flat surface and wherein the guide element has means for controlling the separation of the film from its backing, the guide element being positioned so that a leading section of the side of the film lacking adhesive coating can be pulled across and in contact with said open, unbroken flat surface at the same time a trailing section of the film is being pulled away from its backing, thereby controlling a tendency of the film, without its protective backing, to be attracted to almost any proximate object.

4. A tool according to claim 1 wherein the aperture is further characterized as having a straight outer edge which is situated proximate a juncture of a wall of the aperture with the rearward branch and disposed approximately perpendicularly to a longitudinal axis of the through passageway, so that a leading portion of the side of the film lacking adhesive material can lie flat as it is being pulled across and in contact with the support member at the same time a trailing section of said film is being pulled away from backing.

5. A tool according to claim 1 wherein the holding means further comprises protrusions which extend from the support member and wherein the support member is further characterized as being formed of a resilient material and as being capable of being bent under the application of finger pressure a distance which is at least as great as the difference between the length of each protrusion in a direction perpendicular to the surface of the support member and the thickness of the film.

* * * * *